United States Patent [19]

Soref et al.

[11] Patent Number: 4,728,167
[45] Date of Patent: * Mar. 1, 1988

[54] ELECTRICALLY CONTROLLED INTEGRATED OPTICAL SWITCH

[75] Inventors: Richard A. Soref, Newton Centre; Joseph P. Lorenzo, Stow, both of Mass.

[73] Assignee: The United States of America as represented by the Secretary of the Air Force., Washington, D.C.

[*] Notice: The portion of the term of this patent subsequent to Sep. 15, 2004 has been disclaimed.

[21] Appl. No.: 831,895

[22] Filed: Feb. 24, 1986

[51] Int. Cl.[4] .................................................. G02B 6/10
[52] U.S. Cl. ........................... 350/96.13; 350/96.14; 350/96.15
[58] Field of Search ............... 350/96.11, 96.12, 96.13, 350/96.14, 96.15

[56] References Cited

U.S. PATENT DOCUMENTS

| | | | |
|---|---|---|---|
| 3,810,688 | 5/1974 | Ballman et al. | 350/96 WG |
| 3,837,728 | 9/1974 | Logan et al. | 350/96 WG |
| 3,883,220 | 5/1975 | Taylor | 350/96 WG |
| 3,953,620 | 4/1976 | Chandross et al. | 427/53 |
| 4,003,629 | 1/1977 | Baues et al. | 350/96 C |
| 4,008,947 | 2/1977 | Baues et al. | 350/96 C |
| 4,013,000 | 3/1977 | Kogelnik | 350/96 C |
| 4,120,560 | 10/1978 | Baues et al. | 350/96.14 |
| 4,127,320 | 11/1978 | Li | 350/96.15 X |
| 4,130,342 | 12/1978 | McMahon | 350/96.14 |
| 4,262,992 | 4/1981 | Berthold, III | 350/96.14 |
| 4,420,873 | 12/1983 | Leonberger et al. | 29/576 E |
| 4,472,020 | 9/1984 | Evanchuk | 350/96.12 |

OTHER PUBLICATIONS

Neyer, A., "Electro-optic X-Switch Using Single-Mode Ti: LiNbO3 Channel Waveguides," *Electronic Letters*, 7 Jul. 1983, vol. 19, No. 14, pp. 553, 554.
Neyer et al., "Single-Mode Electrooptic X-Switch for Integrated Optic Switching Networks," Second European Conference on Integrated Optics, Florence, Italy, *Conf. Proceedings*, pp. 136-139, 1983.
Neyer, Andreas, "Operation Mechanism of Electrooptic Multimode X-Switches," *IEEE Journal of Quantum Electronics*, vol. QE-20, No. 9, Sep. 1984, pp. 999-1002.
Mikami, O. et al., "Waveguided Optical Switch in InGaAs/InP Using Free-Carrier Plasma Dispersion," *Electronics Letters*, 15 Mar. 1984, vol. 20, No. 6, pp. 228, 229.
Nakajima, H. et al. "Bipolar Voltage Controlled Optical Switch Using Ti: LiNbO3 Intersecting Waveguides," Fourth Int. Conf. on Integrated Optics and Fiber Optic Communications (IOOC '83), Tokyo, Japan, *Conf. Proc.*, pp. 364, 365.
Pearce C. W., chapter 2, "VLSI Technology," edited by S. M. Sze, McGraw Hill, NY, 1983.

*Primary Examiner*—Eugene R. LaRoche
*Assistant Examiner*—James C. Lee
*Attorney, Agent, or Firm*—Jacob N. Erlich; Donald J. Singer

[57] ABSTRACT

An electrically controlled integrated optical switch having a body made up entirely of crystalline silicon. More specifically, the body has a pair of channel waveguides intersecting in an X-like configuration forming therein an intersection crossover region. A first electrode is positioned on the intersection crossover region and a second electrode is positioned on the bottom of the body opposite the intersection crossover region. A controllable current/voltage source is electrically connected to the electrodes in order to alter the index of refraction of the intersection crossover region in order to change the amount of optical cross coupling of light between the intersecting waveguides.

8 Claims, 6 Drawing Figures

ELECTRICALLY CONTROLLED INTEGRATED OPTICAL SWITCH

STATEMENT OF GOVERNMENT INTEREST

The invention described herein may be manufactured and used by or for the Government for governmental purposes without the payment of any royalty thereon.

BACKGROUND OF THE INVENTION

This invention relates generally to integrated optical circuits and the components making up such circuits, and, more particularly, to an integrated optical switch made completely of silicon and whose index of refraction is controlled by the passing of an electrically controlled current therethrough.

With recent increased development of lasers and optical fibers, more attention has been directed to integrated optical systems or circuits and the components which make up these circuits. Particular concern has been directed to the area of optical communications which operate at a wavelength 1.3 $\mu$m and beyond and the integrated optical circuits which are utilized therein. Since it has been recognized that integrated optical components are capable of coupling efficiently to single-mode optical fibers, such integrated optical components become essential parts of fiber optic communication networks devoted to telecommunications or data communications applications. An excellent example of one such integrated component is the integrated optical switch which finds great utility in its ability to switch in a selected user at each local terminal of, for example, a local-area network.

As pointed out above, of major concern is the transmission of electromagnetic radiation (light) at the 1.3 $\mu$m to 1.55 $\mu$m wavelength area, the wavelengths at which propagation loss through an optical fiber is at a minimum. Switches are an essential component of such integrated optical circuits since it is required within the circuits to switch light energy from one guided-wave path to another.

Initially, mechanical switches which utilize deflecting mirrors positioned to intercept and redirect the light energy of a beam were utilized. These mechanical switches were replaced by more suitable optical components since speed of switching became an essential criteria in the building of optical communication circuit-networks.

Thereafter, integrated optical components became the preferred switching device. These switches followed two approaches:

(1) the formation of heterostructures using exotic alloys of InP on InP, and (2) LiNb$_3$ components formed by titanium-ion in-diffusion or by proton exchange.

Examples of integrated optical components in InGaAsP/InP can be found in a paper by Mikami et al, "Waveguided Optical Switch In InGaAs/InP Using Free-Carrier Plasma Dispersion," *Electronic Letters*, Vol. 20, No. 6, Mar. 15, 1984, pp. 228 and 229, while examples of optical components utilizing Ti:LiNbO$_3$ can be found in a paper by A. Neyer, "Electro-Optic X-Switch Using Single Mode TiLiNbO$_2$ Channel Waveguides," *Electronics Letters*, Vol. 19, No. 14, July 7, 1983, pp. 553 and 554.

There are many drawbacks associated with the formation of heterostructures using exotic alloys of InP on InP. For example, the alloy composition of InGaAsP must be chosen very carefully so that the lattice constant of the quaternary exactly matches the lattice constant of the host InP substrate: the growth apparatus and the growth techniques required to form the alloys are extremely complicated and may include such complex techniques as metal-organic chemical vapor deposition and molecular beam epitaxy: and it is necessary to grow sequentially alternating layers of different materials in order to form the multi-layer heterostructures that are essential in the above-mentioned devices.

The disadvantages with respect to the Ti:LiNbO$_3$ are also numerous. For example, it is difficult to control the diffusion depth and ionic concentration of the Ti ions; the waveguide profiles are semicircular, which is not at an optimum match to the circular fiber-core profile; and there are a number of stability problems associated with this material.

It is therefore clearly evident that there exists a need for improved optical switches, and in particular, it would be highly desireable to fabricate an integrated optical component which is not subject to the drawbacks associated with prior art optical components.

SUMMARY OF THE INVENTION

The present invention overcomes the problems encountered in the past as set forth in detail hereinabove by providing an optical component, more specifically, an integrated optical switch which utilizes a single element material in the form of crystalline silicon (x-Si) and which in conjunction therewith utilizes an electrically controlled current (or electric field) to control the index of refraction thereof.

The electrically controlled integrated optical switch of the present invention is preferably operable in the 1.3-1.55 $\mu$m wavelength region but may extend beyond. It is configured in an X-type channel waveguide structure wherein the intersection (or a wide crossing) therein is also fabricated of single-crystal silicon, for example, in a n on n+ epitaxial structure. A controlled alteration in the index of refraction of the intersection region of the switch is produced by the electrically controlled injection of free carriers into the intersection. These carriers are injected by a forward biased p-n junction. The index change is due to the plasma dispersion effect and the bandgap shrinkage effect. Generally, the crossing angle of the channel waveguide is typically 3 to 4 degrees with the switch being capable of being cascaded into an N×N switch arrangement.

The particular material i.e. crystalline silicon utilized for the integrated optical switch of the present invention is essential and is novel in several respects. First, the switch is built entirely from one material (crystalline silicon) so there is no hetero-laying of one material on another material and there are no heterojunctions for injecting carriers. The present invention relies upon homojunctions.

Secondly, the silicon material does not exhibit the Pockels effect, but instead utilizes other electro-optical switching mechanisms therein. This type of switching is accomplished by the passing an electric current through the silicon in order to alter the index of refraction thereof. Since silicon technology is extremely advanced, although not heretofore used in optical components, problems associated with the complexity of working with the exotic materials of the past have been completely eliminated.

More specifically, the electrically controlled integrated optical switch of the present invention is made totally of crystalline silicon with the starting material being in the form of a single-crystal Si layer grown epitaxially on a heavily doped Si substrate. By photolithography and dry etching, the epi layer is formed into "rib or ridge" waveguides in an intersecting or X-pattern. By choosing the proper rib dimensions, each ridge guide will be a single-mode channel waveguide at the 1.3 or 1.55 μm wavelength.

Generally, the electrically controlled controller is in the form of a pair of Ohmic electrodes positioned on opposite sides of the switch body and a low-voltage source of approximately 5 volts capable of approximately 200 mA maximum output. Adjustment of the current passing through the silicon switch body enables optical switching to take place.

It is therefore an object of this invention to provide a guided-wave integrated optical switch made entirely of crystalline silicon.

It is a further object of this invention to provide an integrated optical switch in which the index of refraction thereof (switching capability) is changed by the application of electrical current or voltage thereto.

It is still another object of this invention to provide an electrically controlled integrated optical switch which is extremely simple to produce and which overcomes many of the manufacturing drawbacks of past integrated optical switches.

For a better understanding of the present invention, together with other and further objects, reference is made to the following description taken in conjunction with the accompanying drawings and its scope will be pointed out in the appended claims.

DETAILED DESCRIPTION OF THE PREFERRED EMBODIMENTS

Figure 3:
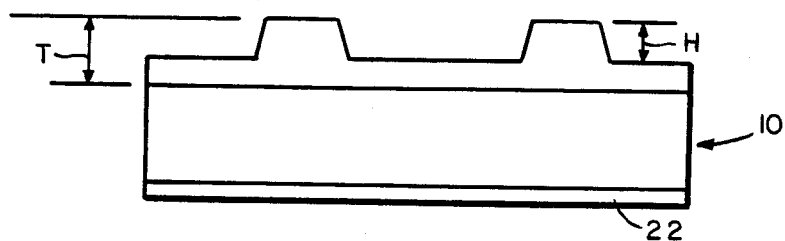
FIG. 3 is an end view of the electrically controlled integrated optical switch of this invention.
Figure 4:
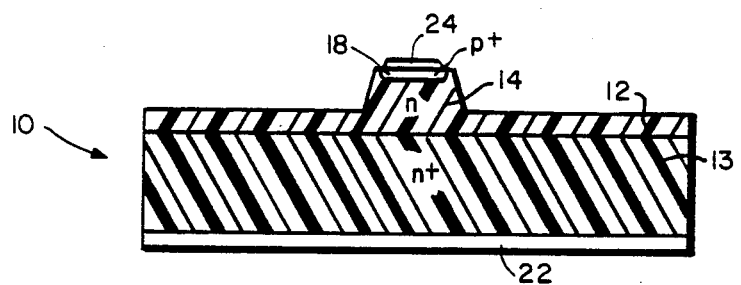
FIG. 4 is a cross-sectional view taken along line IV—IV of FIG. 2 of the electrically controlled optical switch of this invention.

Reference is now made to FIGS. 1-6 of the drawings in which the electrically controlled integrated optical switch 10 of the present invention is clearly depicted therein. It is essential in the present invention that the electrically controlled integrated-optical switch 10 be fabricated entirely of crystalline silicon, for example, in an n on n+ epitaxial structure (c.. in a p on p+ structure). More specifically, switch 10 is fabricated by starting with material in the form of a lightly doped single-crystal silicon layer 12 grown epitaxially on a heavily doped x-Si substrate 13. By photolithography and dry etching, the epi-layer 12 is formed into rib waveguides 14 in an intersecting X-like pattern 15. As illustrated in FIG. 4, the doping of the higher-index n-type waveguide region is in the range of $10^{14}$ to $10^{17}$ impurities/cm$^3$ and the lower-index n+ substrate 13 has a doping of approximately $10^{19}$ cm$^{-3}$. Examples of typical doping impurities would be phosporous or boron. The thickness, T, as shown in FIG. 3, of epitaxial layer 12 is typically 5 to 10 microns.

In the most general case, as shown in FIGS. 1-5, the waveguides 14 are multimode with a rib width W (FIG. 2) of 10 to 15 microns, and a rib height H (FIG. 3)) of 2 to 4 microns. In the multimode switch 10 of FIG. 1, the switching is less complete than it is when the waveguides are single mode, i.e., the multimode switch 10 has higher crosstalk and higher loss than the single mode switch 10' illustrated in FIG. 6, wherein similar components as set forth with respect to FIGS. 1-5 are designated by identical reference numerals. Therefore, a single-mode embodiment (FIG. 6) is preferred for optimum switching.

Figure 6:
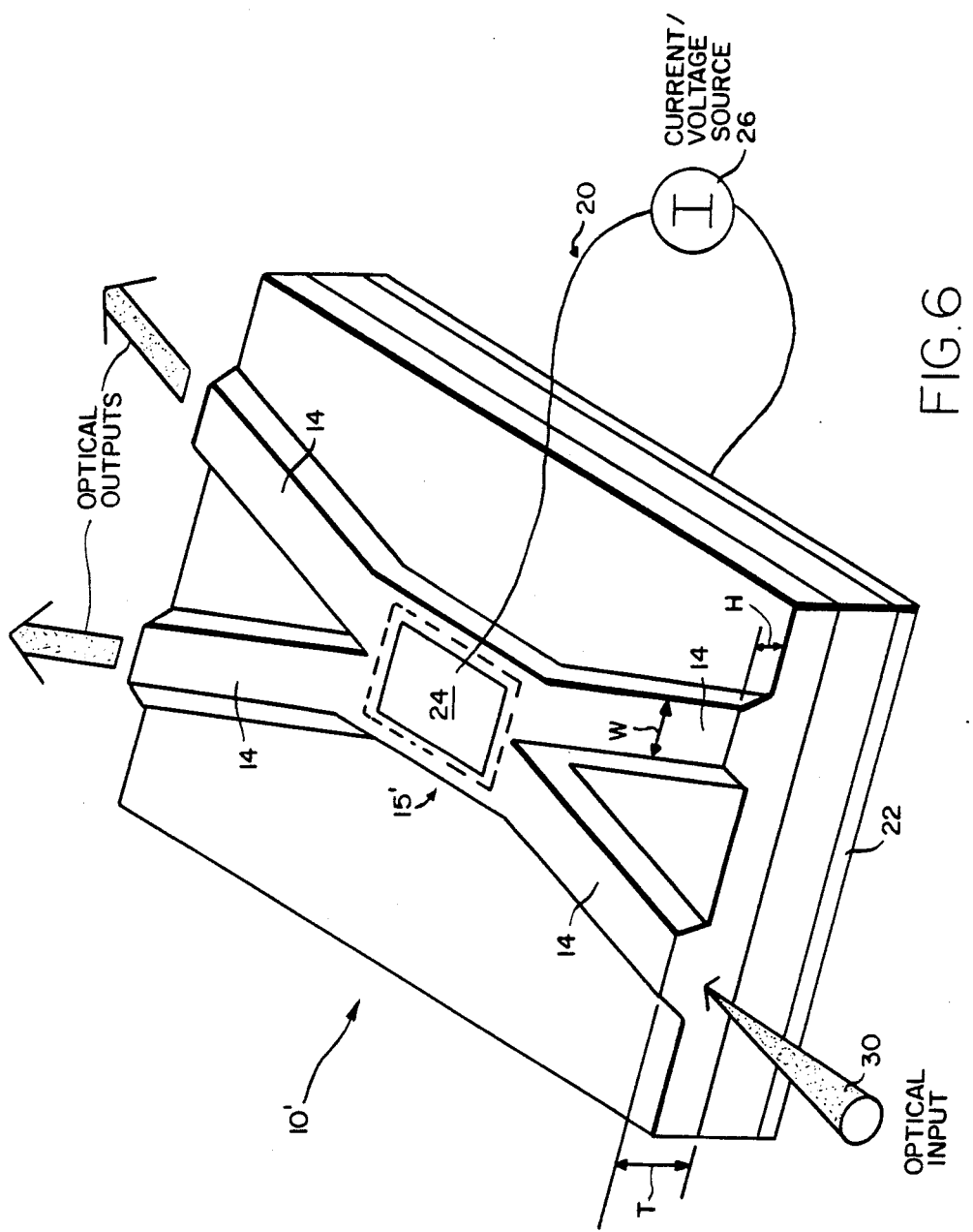
FIG. 6 is a pictorial representation of an alternate embodiment of the electrically controlled integrated optical switch having a larger, double-width waveguide interaction region.

The input and output waveguides 14 in FIG. 6 each support only a single mode at the 1.3 or 1.6 μm wavelength. Here each rib waveguide 14 has a width, W, of 5 to 7 microns, an epi thickness, T, of about 6 microns and a rib height, H, of about 3 microns. In addition, the width of the waveguide intersection 15' is twice the width of the single-mode input/output guides 14 so that this region will support two guided modes, an even and an odd mode. (Two-mode interference is useful for "clean" switching). The length of the intersection region is also slightly longer than that of FIG. 1. Because of its efficient, low-crosstalk switching, the extended-X with double-width coupling region (FIG. 6) is the most useful structure.

Referring again to FIG. 1-6 of the drawings, if, for example, an n on n+ wafer is utilized, then fabrication of a P+ region 18 on top of the intersection region 15 as illustrated clearly in FIGS. 4 and 5 and would form a p+-n junction at that location. This junction 18 could be formed by ion implantation or by thermal indiffusion of ions. The depth of the junction 18 below the surface of the intersection waveguide crossover region 15 would be approximately 0.4 microns, so it would only take up a small portion of the waveguide height.

Figure 5:
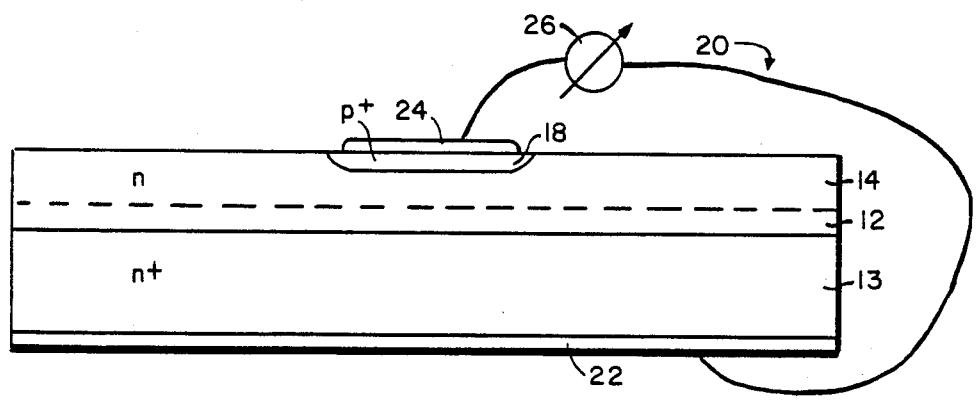
FIG. 5 is a side view of the electrically controlled integrated optical switch of this invention.

As pointed out above, it is essential that 2×2 switch 10 or 10' of the present invention be made entirely out of crystalline silicon (x-Si). The optical absorption losses in polycrystalline silicon and amorphous silicon are too high for practical devices, where, x-Si has very low loss. Although x-Si does not exhibit the Pockels effect, there are three important electro-optical mechanisms in x-Si that are practical for optical switching. These are as follows: electrically controlled injection of carriers, depletion of carriers, and electro-refraction. Each of these effects perturbs the refractive index of x-Si without introducing appreciable optical loss. Injection, for example, is accomplished by passing electric current through the silicon. Generally, the electrically controlled controller 20 utilized in the present invention and as illustrated in FIG. 5 of the drawings is in the form of a variable voltage source 26, plus a pair of Ohmic contacts 22 and 24 positioned on opposite sides of the body of switch 10. In the injection case, a 5-volt source 26 capable of approximately 200 mA maximum output is preferable, and is connected between electrodes 22 and 24. The electrode locations provide uniform current density in the p+-n-n+ waveguide crossover region 15.

If p+-n junction 18 is forward biased, then minority carriers will be injected into the n-type waveguide intersection region 15 (15'), and the effective mode indicies of the waveguide 14 will be altered due to the plasma dispersion effect and due to the decreased energy gap of this semiconductor that occur at high injection. When current densities of 5 to 10 kA/cm$^2$ are applied, more than $10^{18}$ carriers/cm$^3$ will be injected, and the resulting index change will be $10^{-3}$ or more. Adjustment of the current passing through the silicon body by altering the source-output enables optical switching to take place between the crossed waveguides 14.

The junction 18 depicted in conjunction with electrically controlled switch of the present invention can also be reverse-biased. In that case, two other physical effects come into play. At high reverse bias, below breakdown, the current is relatively low (microamperes) and the electric fields in the silicon are high. This mode of operation would require a higher voltage source than the forward-bias mode. Here, the depletion layer next to the abrupt p-n interface would enlarge with increasing bias, and would spread across the epitaxial layer in the n-type waveguide intersection region 15 or 15'. Strong electric fields, as much as $10^4$ to $10^5$ V/cm, would be set up also in the waveguide region. The depletion of free carriers would modify the refractive index of the x-Si, and the E-fields would also create $\Delta n$ by means of the electro-refraction effect. The electro-refraction effect is the real-index counterpart of the Franz-Keldysh effect, and the electro-refraction is strongest for photon energies of 0.96 to 1.05 eV, near the 1.10 eV band edge of x-Si. The effect arises from energy band shifts. Under proper conditions, the reverse-bias index perturbations in x-Si can range from $10^{-4}$ to $10^{-2}$, comparable to the forward bias case. In summary, both forward-and reverse-bias optical switching are feasible.

MODE OF OPERATION

In the operation, and referring to the electrical integrated optical switch 10' depicted in FIG. 6, for example, a beam 30 of electromagnetic radiation (light) at a wavelength of 1.3 μm is launched into the fundamental mode (an even mode) of waveguide 14 by a single-mode fiber or laser (not shown). When the optical "beam" arrives at the double-width intersection or junction 15', both an even and an odd mode are excited, and these optical waveguide modes travel with propagation constants $\beta_{00}$ and $\beta_{01}$, respectively. After traversing a length L, the modes have a relative phase $\Delta\phi = [\beta_{00} - \beta_{01}]L$, and they combine (in the zero-current case) to excite the fundamental mode of the straight-through guide, which gives a "straight ahead" optical output. The width of the p$^+$-n junction is nearly the same as that of the intersection region 15', i.e., 2W. Thus, when current is applied by a variable electrical source and carriers are injected, the mode index of the even mode $\beta_{00}$ is altered, but the index of the odd mode is relatively uneffected. (It would take an unsymmetric half-width p-n junction to affect $\beta_{01}$). As a result, the phase difference $\Delta\phi$ is altered and the two optical outputs of the switch will have optical power levels described by: $P_3/P_1 = \sin^2(\Delta\phi/2)$ and $P_4/P_1 = \cos^2(\Delta\phi/2)$. At sufficient current, $\Delta\phi = \Delta\phi + \pi$, the modes now combine (interfere) to give total output in the crossguide (complete switching occurs). With two independent optical inputs, superposition shows that switch 10' as depicted in FIG. 6 becomes a 2×2 electro-optical switch. At the $\Delta n$ values cited above, complete exchange of optical energy between the guides 14 is feasible.

Figure 1:
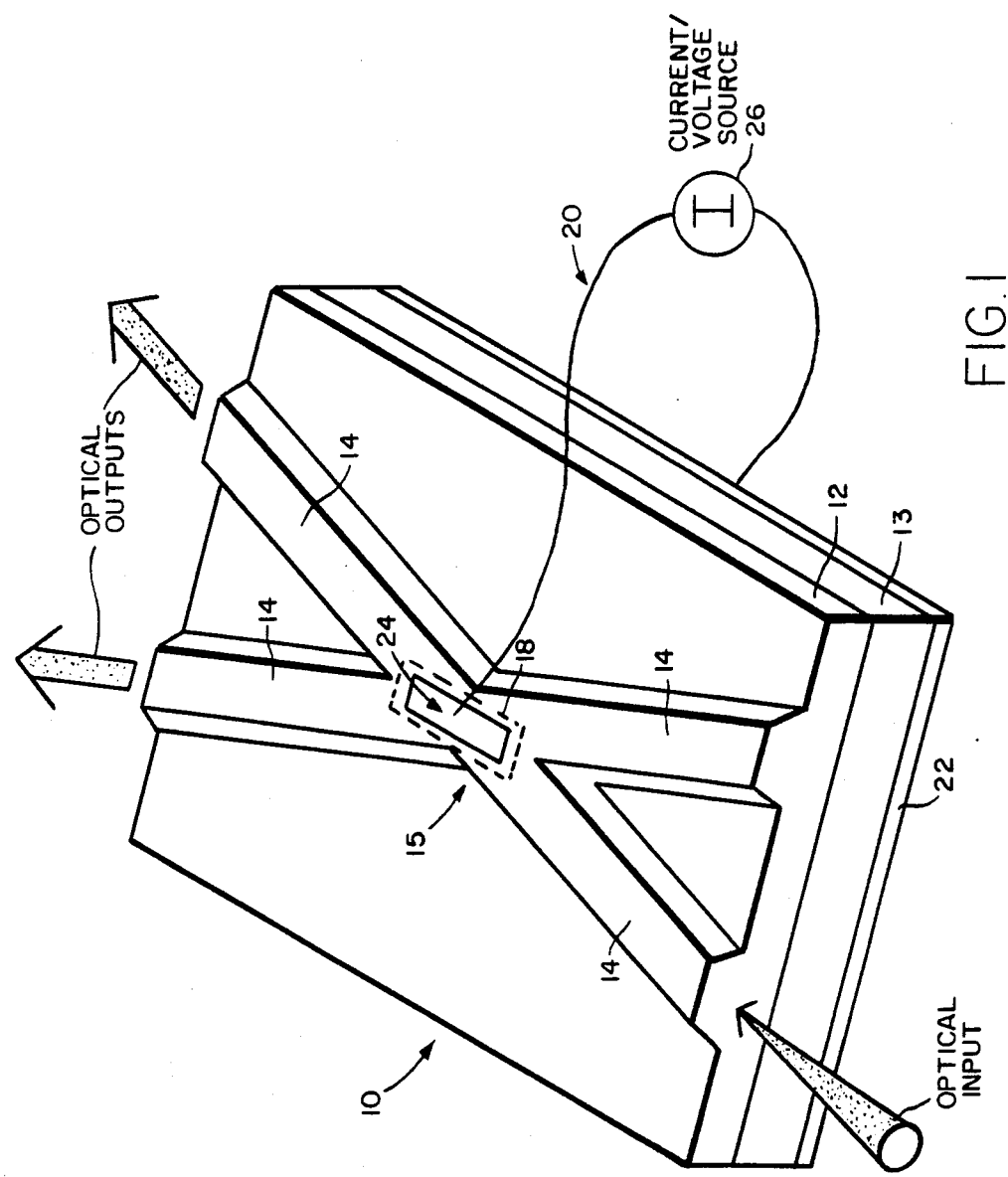
FIG. 1 is a pictorial representation of the electrically controlled integrated optical switch of this invention.
Figure 2:
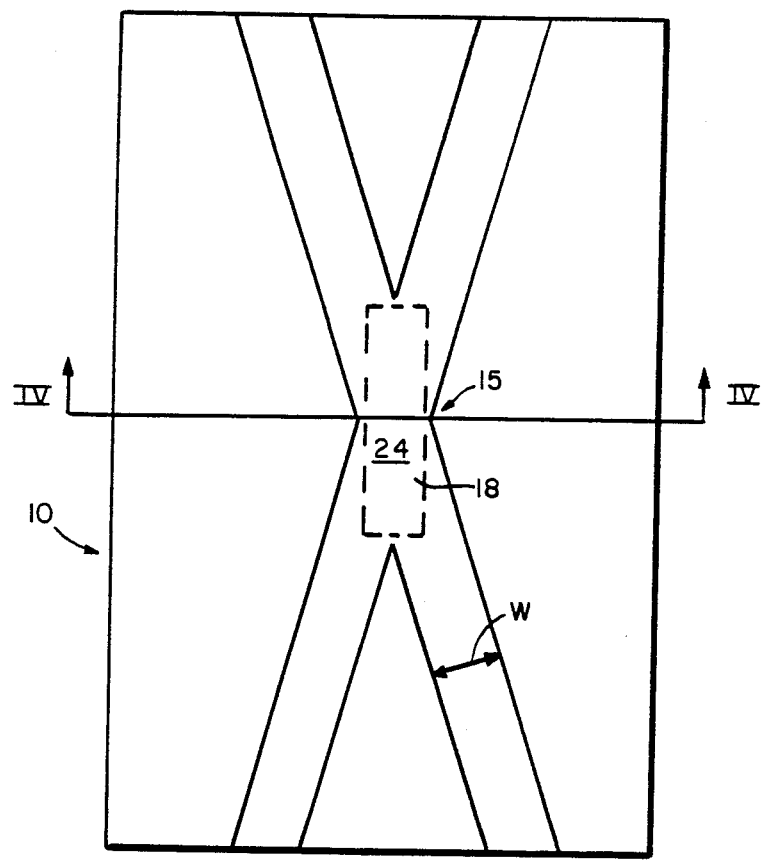
FIG. 2 is a plan view of the electrically controlled integrated optical switch of this invention.

It should be noted that the p$^+$-n-n$^+$ structure in FIGS. 1 or 6 could just as easily be an n$^+$-p-p$^+$ structure. For clarity, an SiO$_2$ passivation layer covering the p-n junction edges was not shown in the Figures, but may be desirable. The oxide would also be located under the lead-in electrodes. Various features would be added to the structures shown to improve performance; for example, a thin p$^-$ silicon cladding layer could be formed atop the n-type epi as a cladding (a p$^+$-p$^-$-n-n$^-$ structure) to reduce optical "tailing" loss in the p$^+$ region. For reverse-biasing, the doping level of the waveguides could be reduced to give a p$^+$-i-n$^+$ structure for a more uniform electric field throughout the epi layer.

Although the invention has been described with reference to a particular embodiment, it will be understood that this invention is also capable of further and other embodiments within the spirit and scope of the appended claims.

We claim:
1. An electrically-controlled integrated optical switch, comprising:
    a body made up entirely of crystalline silicon,
    an X-like channel waveguide structure having a first leg and a second leg formed within said silicon body, said first and said second legs intersecting to form an intersection crossover region of predetermined size; and
    means associated with said body for altering the index of refraction of said silicon body and therefore changing the cross-coupling of light between said first leg and said second leg of said X-like channel waveguide structure.

2. An electrically-controlled integrated optical switch as defined in claim 1 wherein said means for altering said index of refraction of said silicon body comprises a p-n homojunction in said silicon at said intersection crossover region and means for applying an electric field across said p-n homojunction in order to inject carriers into said silicon.

3. An electrically-controlled integrated optical switch as defined in claim 2 wherein said means for applying said electric field comprises: a pair of electrodes, said electrodes being connected to opposite sides of said body, and means for providing a controllable voltage across said electrodes.

4. An electrically-controlled integrated optical switch as defined in claim 3 wherein said X-like channel waveguide structure transmits light at a wavelength of 1.3 μm or greater.

5. An electrically-controlled integrated optical switch as defined in claim 4 wherein one of said pair of electrodes is positioned at said intersection crossover region of said X-like channel waveguide structure and the other of said pair of electrodes is positioned at the bottom surface of said body opposite said intersection crossover region.

6. An electrically-controlled integrated optical switch as defined in claim 5 wherein said body is made up of a crystalline silicon layer grown epitaxially on a crystalline silicon substrate.

7. An electrically-controlled integrated optical switch as defined in claim 6 wherein each of said legs of said X-like channel waveguide structure has a rib-shaped cross-section with an epitaxial layer thickness of 5-10 microns, a rib-height of approximately 3 microns and a rib width approximately 5-7 microns, so as to support only the fundamental waveguide mode.

8. An electrically-controlled integrated optical switch as defined in claim 7 wherein the width of said intersection crossover region is approximately equal to twice said rib width of one of said legs of said X-like channel waveguide structure.

* * * * *